Patented Feb. 24, 1953

2,629,712

UNITED STATES PATENT OFFICE 2,629,712

PROCESS FOR PREPARING POLYMERS OF ACRYLONITRILE

Theodore E. Stanin, Harry W. Coover, and Joseph B. Dickey, Rochester, N. Y., assignors to Eastman Kodak Company, Rochester, N. Y., a corporation of New Jersey No Drawing. Application September 16, 1948, Serial No. 49,652

10 Claims. (Cl. 260—88.7)

This invention relates to an improved process for preparing polymers (both the homopolymers and interpolymers) of acrylonitrile.

Polymers of acrylonitrile and numerous methods for their preparation have been described previously in the chemical literature, and both foreign and domestic patents. More recently, it has been proposed to use polymers of acrylonitrile in the manufacture of synthetic fibers or films. The use of these polymers for this purpose has been somewhat limited due to the difficulty of obtaining a polymer having the desired solubility properties, as well as the property of giving uniformly colorless fibers when their solutions are spun through a spinneret into a precipitating bath. The polymers of acrylonitrile previously employed have an undesirable tendency to give gelled particles when dissolved in a solvent, such as dimethylformamide. These gelled particles can be dissolved to some degree by heating, however, the heating causes discoloration of the fibers spun from a heated solution, and if the solution is cooled to room temperature again, the gelled particles generally reappear. If these gelled particles are allowed to remain suspended in the solution the spinnerets become clogged during the spinning and the fiber obtained is uneven and of low tensile strength. Equally important, the fibers produced by spinning solutions of polymers of acrylonitrile made by the methods heretofore employed are not white in color, but have an undesirable brownish color which makes them difficult to use without further treatment, which materially lowers the strength and uniformity of the fibers. It can thus be seen that it is highly desirable to provide a process for manufacturing polymers of acrylonitrile which give uniform, gel-free solutions, and whose solutions when spun into a coagulating bath give lustrous, colorless fibers.

A further difficulty encountered in working with polymers of acrylonitrile containing large quantities of acrylonitrile in the polymer molecule (usually on the order of from 80 to 100 per cent by weight) has been the property of these polymers to show such limited solubility in the usual organic solvents, such as acetone. This difficulty has served to stimulate a widespread program of experimentation in the art to find suitable solvents that would increase the utility of polymers of acrylonitrile, which have long been recognized as having properties of considerable economic importance. Dimethylformamide is perhaps one of the more common solvents which is in use at present for dissolving these polymers; however, this substance is toxic to use, thus constituting a hazard which has to be reckoned with when used in a confined area, such as a factory. Dimethylformamide is subject to further objection because of its lack of stability and tendency to release dimethylamine. A solvent which would overcome these difficulties would, therefore, be most useful in increasing the use of polymers of acrylonitrile in the preparation of white fibers and colorless films.

It is, accordingly, an object of our invention to provide an improved process for preparing polymers of acrylonitrile. A further object is to provide polymers of acrylonitrile which can be dissolved in solvents to give gel-free solutions. A still further object is to provide solutions of polymers of acrylonitrile which give lustrous, colorless fibers when spun into a coagulating bath. Another object is to provide a solvent for dissolving polymers of acrylonitrile, which is not as toxic as dimethylformamide and gives stable solutions. Other objects will become apparent from a consideration of the following description and examples.

According to the process of our invention, we accomplish the above objects by polymerizing acrylonitrile (either homopolymerizing or interpolymerizing) in an aqueous solution in the presence of an oxygen acid of phosphorus. Typical acids include hypophosphoric acid ($H_4P_2O_6$), metaphosphoric acid ($HPO_3$), orthophosphoric acid ($H_3PO_4$), pyrophosphoric acid ($H_4P_2O_7$), hypophosphorous acid ($H_3PO_2$), orthophosphorous acid ($H_3PO_3$), metaphosphorous acid ($HPO_2$), and pyrophosphorous acid ($H_4P_2O_5$). Orthophosphoric, orthophosphorous and hypophosphorous acids have been found to be especially useful in carrying out the process of our invention.

We have further found that our polymers of acrylonitrile can be readily dissolved in N,N-dimethylacetamide to give solutions which are not as toxic as dimethylformamide, and which overcome other difficulties inherent in the use of dimethylformamide. For reasons which are not readily apparent, the polymers of acrylonitrile previously prepared by prior art processes will not dissolve in N,N-dimethylacetamide to give solutions suitable for spinning, although they do dissolve in dimethylformamide. Since N,N-dimethylacetamide was not a suitable solvent for the polymers previously prepared, it was most surprising to find that it was excellently suited for dissolving polymers prepared by the present process. The preparation of polymer solutions from N,N-dimethylacetamide is, therefore, closely related to our improved process for preparing polymers of acrylonitrile.

In our polymerization of acrylonitrile, we advantageously add the acrylonitrile to a quantity of water which is sufficient to dissolve a substantial portion of the acrylonitrile. Generally the amount of water present dissolves about 75 per cent of the acrylonitrile added, the remaining acrylonitrile forming a dispersion in the aqueous solution. As the polymerization proceeds the polymerized acrylonitrile precipitates out of solution and more of the dispersed acrylonitrile goes into solution. In practicing our invention, it is not essential that all of the acrylonitrile be dissolved in the aqueous reaction medium at one time, since a dispersion of acrylonitrile inherently has some of the acrylonitrile dissolved in the aqueous phase. The oxygen acid of phosphorus can be dissolved in water and the acrylonitrile then added, or the acrylonitrile can be added to the water first and the oxygen acid of phosphorus added subsequently. The quantity of oxygen acid of phosphorus used varies and depends on the volume of water present, the quantity of materials being polymerized, etc. Sufficient oxygen acid of phosphorus should be used to maintain a pH of from 1 to 3 throughout the polymerization, since we have found polymerizations carried out outside this range do not give polymers having desirable characteristics, even where oxygen acid of phosphorus is employed. We have found the polymers having especially desirable properties are obtained when the polymerization is carried out at pH of from 1.5 to 2.0, although the broader range of 1 to 3.0 is adequate for most purposes.

The polymerization is effected in the presence of an alkali metal persulfate polymerization catalyst (i. e. persulfates of the elements of group I of the periodic table, such as sodium, potassium, lithium, etc.), or ammonium persulfate, and a water-soluble inorganic compound of sulfur selected from the group consisting of alkali metal and ammonium bisulfites, such as sodium bisulfite, potassium bisulfite, ammonium bisulfite, etc.; alkali metal and ammonuim sulfites, such as soduim sulfite, potassium sulfite, ammonium sulfite, etc.; alkali metal and ammonium thiosulfates, such as sodium thiosulfate, potassium thiosulfate, ammonium thiosulfate, etc.; alkali metal sulfides, such as sodium sulfide, potassium sulfide, sodium hydrosulfide (NaSH), potassium hydrosulfide (KSH), etc.; ammonium sulfides, such as ammonium sulfide and ammonium hydrosulfide, hydrogen sulfide ($H_2S$), and sulfur dioxide. The term alkali metal as used herein is intended to define the metals of group I of the periodic table of the elements. The persulfate polymerization catalyst is activated by the water-soluble inorganic compound of sulfur having a reducing action, which lowers the induction period preceding the initiation of the ploymerization. The activators are also useful in providing a convenient method for regulating the molecular weight of the polymer, the molecular weight being a function of the quantity of activator employed. The quantity of persulfate catalyst can be varied, depending on the conditions of polymerization and the quantity of material being polymerized. Generally, we have found that from 0.5 to 2.5 per cent by weight, based on the materials being polymerized, is sufficient for the purposes of our invention. Especially useful polymers have been obtained when about 2 per cent by weight of persulfate is employed. The quantity of water-soluble inorganic compound of sulfur used as an activator can be varied, the amount used being somewhat arbitrary. Generally, from 0.5 to 7 molar equivalent of the activator for each molar equivalent of persulfate catalyst, are adequate for practicing the process of our invention. A more limited range which we have found to be useful is from 1 to 2 molar equivalents of the activator for each molar equivalent of the persulfate polymerization catalyst, especially where from 1 to 2 per cent by weight, based on the total weight of polymerizable materials present, of persulfate polymerization catalyst is used. Larger or smaller amounts of the activator can be used, although there is ordinarily no advantage in doing so. About 5 molar equivalents of activator for each equivalent of persulfate has been found to give especially good results. The amount of oxygen acid of phosphorus used is usually from 1 to 3 molar equivalents for each molar equivalent of the persulfate catalyst and the activator combined.

The polymer which precipitates from the aqueous solution is separated and washed several times to free the polymer from excess acid and occluded catalyst or activator. It is not necessary to remove all of the oxygen acid of phosphorus from the polymer, since we have found that small amounts actually have a beneficial effect when the polymer is dissolved in a solvent for spinning. This process is more fully described in our application Serial No. 49,654, filed on even date herewith, now U. S. Patent 2,503,244, dated April 11, 1950.

The following examples will more fully describe the manner whereby we carry out the process of our invention.

*Example I*

100 gms. of 85 per cent of orthophosphoric acid (0.87 mole, calculated as 100 per cent acid) were dissolved in 9 liters of distilled water, and the solution was added to a 3-necked, 12-liter flask which was equipped with a gate type, stainless steel stirrer. The air in the flask was replaced with nitrogen gas and 900 gms. (17 moles) of freshly distilled acrylonitrile were then added. The mixture was stirred and about 75 per cent of the acrylonitrile went into solution. While the solution was slowly stirred, 18 gms. (0.079 mole) of ammonium persulfate and 36 gms. (0.35 mole) of sodium bisulfite were added and dissolved. The polymerization began almost immediately as evidenced by the formation of a powdery, white precipitate. The solution was stirred from time to time to aid in dissolving the unsolubilized portion of the acrylonitrile and the dissipation of the small amount of heat released due to the exothermic nature of the polymerization. After all of the monomeric material had been dissolved, the stirring was discontinued. At the end of 18 hours the reaction mixture was filtered with the air of suction, and the filter cake was washed free of acid with distilled water and then dried. There were thus obtained 800 gms. of dry polyacrylonitrile, having an intrinsic viscosity of 1.96, as measured in a 0.25 per cent by weight solution of the polymer in dimethylformamide.

The dry polymer was then sifted through a 20-mesh screen, and 140 gms. of this powder were added to 1000 cc. of N,N-dimethylacetamide. The mixture was stirred and shaken rapidly to form a good slurry. After tumbling this slurry end over end in a container at 90° to 100° C. for 2 hours, a very light-colored, smooth viscous solution (dope) of the polyacryonitrile was obtained, which gave lustrous, white fibers when spun into a coagulating bath.

*Example II*

1.08 gms. (0.011 mole) of orthophosphoric acid (calculated as 100 per cent acid) were dissolved in 200 cc. of distilled water, and 20 gms. (0.38 mole) of freshly distilled acryonitrile added. While slowly stirring the solution, 0.4 gm. (0.00175 mole) of ammonium persulfate and 0.8 gm. (0.0078 mole) of sodium bisulfite were added and dissolved. The pH of the solution thus obtained was about 2.0. The polymerization began almost immediately as evidenced by the formation of a fine, white precipitate. The solution was stirred from time to time to aid in dissolving any acrylonitrile not in solution and the dissipation of the small amount of heat released during the polymerization. After all the monomeric material had gone in solution, the stirring was discontinued. At the end of 18 hours, the reaction mixture was filtered, with the aid of suction, and the filter cake was washed free of acid with distilled water and then dried. Solutions of the polymer in either dimethylformamide or N,N-dimethylacetamide gave lustrous, white fibers when spun into a coagulating bath.

*Example III*

2.0 gms. (0.02 mole) of orthophosphoric acid (calculated as 100 per cent acid) were dissolved in 200 cc. of distilled water, and 20 gms. (0.38 mole) of freshly distilled acrylonitrile added. While slowly stirring the solution, 0.4 gm. (0.00175 mole) of ammonium persulfate and 0.8 gm. (0.0078 mole) of sodium bisulfite were added and dissolved. The pH of the solution thus obtained was about 1.8. The polymerization began almost immediately as evidenced by the formation of a fine, white precipitate. The solution was stirred from time to time to aid in dissolving any acrylonitrile not in solution and the dissipation of the small amount of heat released during the polymerization. After all the monomeric material had gone in solution, the stirring was discontinued. At the end of 18 hours the reaction mixture was filtered with the aid of suction, and the filter cake was washed free of acid with distilled water and then dried. Solutions of the polymer in either dimethylformamide or N,N-dimethylacetamide gave lustrous, white fibers when spun into a coagulating bath.

*Example IV*

4.0 gms. (0.041 mole) of orthophosphoric acid (calculated as 100 per cent acid) were dissolved in 200 cc. of distilled water, and 20 gms. (0.38 mole) of freshly distilled acrylonitrile added. While slowly stirring the solution, 0.4 gm. (0.00175 mole) of ammonium persulfate and 0.8 gm. (0.0078 mole) of sodium bisulfite were added and dissolved. The pH of the solution thus obtained was about 1.6. The polymerization began almost immediately as evidenced by the formation of a fine, white precipitate. The solution was stirred from time to time to aid in dissolving any acrylonitrile not in solution and the dissipation of the small amount of heat released during the polymerization. After all the monomeric material had gone in solution, the stirring was discontinued. At the end of 18 hours, the reaction mixture was filtered with the aid of suction, and the filter cake was washed free of acid with distilled water and then dried. Solutions of the polymer in either dimethylformamide or N,N-dimethylacetamide gave lustrous, white fibers when spun into a coagulating bath.

*Example V*

2.0 gms. (0.025 mole) of anhydrous metaphosphoric acid were dissolved in 200 cc. of distilled water, and 0.2 gm. (0.001 mole) of ammonium persulfate and 0.4 gm. (0.004 mole) of sodium bisulfite were added and dissolved. Acrylonitrile was added and polymerization began almost immediately as evidenced by the formation of a powdery, white precipitate. The solution was stirred from time to time to aid in dissolving the unsolubilized monomeric material and to dissipate the small amount of heat of reaction. After all of the monomer had dissolved, the stirring was discontinued. At the end of 16 hours the reaction mixture was filtered with the aid of suction, and the filter cake was washed with distilled water and then dried. Solutions of the above polymer in dimethylformamide or N,N-dimethylacetamide gave lustrous, white fibers when spun into a coagulating bath, such as water.

*Example VI*

2.0 gms. (0.02 mole) of orthophosphoric acid (calculated as 100 per cent acid) were dissolved in 200 cc. of distilled water, and 0.2 gm. (0.001 mole) of ammonium persulfate and 0.4 gm. (0.004 mole) of sodium bisulfite were added and dissolved. Acrylonitrile was added and polymerization began almost immediately as evidenced by the formation of a powdery, white precipitate. The solution was stirred from time to time to aid in dissolving the unsolubilized monomeric material and to dissipate the small amount of heat of reaction. After all of the moonmer had dissolved, the stirring was discontinued. At the end of 16 hours the reaction mixture was filtered with the aid of suction, and the filter cake was washed with distilled water and then dried. Solutions of the above polymer in dimethylformamide or N,N-dimethylacetamide gave lustrous, white fibers when spun into a coagulating bath, such as water.

*Example VII*

2.0 gms. (0.03 mole) of hypophosphorous acid (calculated as 100 per cent acid) were dissolved in 200 cc. of distilled water, and 0.2 gm. (0.001 mole) of ammonium persulfate and 0.4 gm. (0.004 mole) of sodium bisulfite were added and dissolved. Acrylonitrile was added and polymerization began almost immediately as evidenced by the formation of a powdery, white precipitate. The solution was stirred from time to time to aid in dissolving the unsolubilized monomeric material and to dissipate the small amount of heat of reaction. After all of the monomer had dissolved, the stirring was discontinued. At the end of 16 hours the reaction mixture was filtered with the aid of suction, and the filter cake was washed with distilled water and then dried. Solutions of the above polymer in dimethylformamide or N,N-dimethylacetamide gave lustrous, white fibers when spun into a coagulating bath, such as water.

*Example VIII*

2.0 gms. (0.025 mole) of orthophosphorous acid (calculated as 100 per cent acid) were dissolved in 100 cc. of distilled water, and 0.2 gm. (0.001 mole) of ammonium persulfate and 0.4 gm. (0.004 mole) of sodium bisulfite were added and dissolved. Acrylonitrile was added and polymerization began almost immediately as evidenced by the formation of a powdery, white precipitate. The solution was stirred from time to time to aid in dissolving the unsolubilized monomeric material and to dissipate the small amount of heat reaction. After all of the monomer had dissolved, the stirring was discontinued. At the end of 16 hours the reaction mixture was filtered with the aid of suction, and the filter cake was washed with distilled water and then dried. Solutions of the above polymer in dimethylformamide or N,N-dimethylacetamide gave lustrous, white fibers when spun into a coagulating bath, such as water.

The following examples illustrate some of the more conventional methods for making polyacrylonitrile which have heretofore been used in the prior art.

*Example IX*

200 gms. of freshly distilled acrylonitrile were added to 600 cc. of distilled water and the mixture stirred slowly to effect solution. While stirring 0.2 gm. of potassium persulfate and 2 gms. of dodecyl mercaptan were added and the mixture heated at 95° C. A precipitate began to form almost at once, and when no more precipitate separated, heating was discontinued, and the reaction mixture was cooled and filtered. The filter cake was washed with water and then dried. The dry polyacrylonitrile was soluble in dimethylformamide on heating, but the solution of the polyacrylonitrile in the dimethylformamide contained gel-like particles in suspension, and when spun into a coagulating bath gave a yarn of light brown color.

*Example X*

5 gms. of freshly distilled acrylonitrile were added to 45 cc. of distilled water, and the mixture stirred to effect solution. The mixture was then stirred while 1 gm. of hydrogen peroxide was added. The air above the mixture was replaced with nitrogen gas, and when the mixture was warmed a precipitate began to form. When no more precipitate separated out, heating was discontinued and the reaction mixture was cooled and filtered. The filter cake was washed with distilled water and then dried. The dry polyacrylonitrile was soluble in dimethylformamide on heating, but the solution of polyacrylonitrile in dimethylformamide when spun into a coagulating bath gave a yarn having a light tan color.

*Example XI*

12.8 gms. of freshly distilled acrylonitrile were added to 75 cc. of distilled water, and the mixture stirred to effect solution. While slowly stirring, 0.072 gm. of ammonium persulfate and 0.144 gm. of sodium bisulfite were added and dissolved. The reaction mixture was heated to 40° C. and a precipitate began to form almost at once. When no more precipitate separated out, the reaction mixture was cooled and filtered. The filter cake was washed with distilled water and dried. The dye polyacrylonitrile was dissolved in dimethylformamide to give a light colored solution upon heating, but upon cooling the solution, gel-like particles formed. The polymer did not give solutions suitable for spinning when added to N,N-dimethylacetamide. When the solution of polyacrylonitrile in dimethylformamide was spun into a coagulating bath, light tan-colored fibers were obtained.

To further demonstrate the marked improvement in properties in the polymer obtainable in our process over those obtained previously, the transmission of light by the solutions of polyacrylonitrile obtained in some of the above examples was measured. The amount of transmission proved to be a reliable means for measuring the extent of solution and detection of any irregularities present. The blue light transmission is a particularly useful method of illustrating the solution properties, since blue light is more highly absorbed in a discolored solution than the other colors of the spectrum. The results obtained are given in the table below.

| Polymer of Example | Unheated Solutions [1] | | Solution heated for 5 minutes at 100° C., percent Blue light transmitted |
|---|---|---|---|
| | Percent White light transmitted | Percent Blue light transmitted | |
| II | 94 | 89 | 79 |
| III | 94 | 92 | 80 |
| IV | 95 | 90 | 79 |
| V | | 85 | |
| VI | | 92 | |
| VII | | 89 | |
| VIII | | 93 | |
| IX | 4 | 3 | 72 |
| X | 7 | 5 | 75 |
| XI | 4 | 3 | 66 |

[1] The solutions were prepared by dispersing 0.5 gm. of the dry polyacrylonitrile, ground to 20 mesh size, in 10 cc. of dimethylformamide and stirring the dispersion intermittently over a period of one hour.

The above measurements were all based on the transmission of pure dimethylformamide, which was set at 100 per cent. It can thus be seen that the transmission of the solutions of the polymers prepared according to Examples IX to XI only approaches that of the solution of the polymers prepared according to Examples II to VIII, when the solutions of the polymers of Examples IX to XI were heated. Heating, however, further lowers the color characteristics of fibers spun from the heated solutions, long periods of heating being particularly undesirable. The polymers of Examples II to VIII give solution showing a blue light transmission of about 90 per cent, or better, without any heating, which is materially better than the other solutions, even when heated. As pointed out above, the color of yarns spun from solutions of the polymers obtained in Examples II to VIII is a bright white, while solutions of the polymers of Examples IX to XI give tan-colored yarns when spun into a coagulating bath.

While our process has been described above with particular reference to the homopolymerization of acrylonitrile, it is to be understood that it is likewise useful in the interpolymerization of acrylonitrile with other polymerizable substances, such as acrylic acid, acrylamide, ethyl acrylate, vinyl acetate, vinyl chloride, styrene, etc., to give interpolymers which cannot be dissolved by the usual organic solvents. Such interpolymers should usually contain at least 80 per cent by weight of acrylonitrile in the polymer molecule, since polymers containing less than this amount melt at too low temperatures to warrant their use in the preparation of fibers or yarns. Generally from 6 to 9 per cent by weight of the other polymerizable material in the interpolymer is adequate for the purposes of our invention.

The following example illustrates the manner whereby an interpolymer of acrylonitrile with another interpolymerizable compound containing carbon to carbon unsaturation can be prepared.

Example XII 2.2 gms. (0.019 mole, calculated as 100 per cent acid) of 85 per cent orthophosphoric acid were dissolved in 200 cc. of distilled water, and 0.8 gm. (0.0078 mole) of sodium bisulfite and 0.4 gm. (0.00175 mole) of ammonium persulfate were added and dissolved. While slowly stirring the solution, 16 gms. (0.3 mole) of freshly distilled acrylonitrile and 4 gms. (0.055 mole) of acrylic acid were added. The polymerization began almost immediately as evidenced by the formation of a fine, white precipitate. After all of the monomers had dissolved, the stirring was discontinued and the reaction mixture was allowed to stand 16 hours at room temperature. The reaction mixture was then filtered with the aid of suction, and the filter cake was washed with distilled water, and then dried. There were thus obtained 17.2 gms. of an interpolymer of acrylonitrile and acrylic acid, which dissolved readily in N,N-dimethylacetamide without heating to form a smooth, colorless, very viscous solution (dope).

Using the process outlined in the above example, other interpolymers were prepared by replacing the 4 gms. of acrylic acid with 4 gms. of acrylamide, 4 gms. of vinyl acetate, or 6 gms. of acrylamide. All of these polymers exhibited this unique solubility in N,N-dimethylacetamide, forming clear, colorless, viscous solutions when dispersed therein without heating. While it is generally preferred to prepare interpolymers containing at least 80 per cent by weight of acrylonitrile in the polymer molecule, as noted above, our process is also readily adaptable to methods wherein the polymer contains less than this amount, e. g. 70 to 73 per cent by weight of acrylonitrile in the polymer molecule (such as the above instance where 16 gms. of acrylonitrile were interpolymerized with 6 gms. of acrylamide).

In a manner similar to that illustrated in the above examples, molecularly equivalent amounts of other oxygen acids of phosphorous (e. g. hypophosphoric, pyrophosphoric, pyrophosphorous, metaphosphorous, etc. acids) can replace the acids illustrated to give polymers exhibiting this unique solubility in N,N-dimethylacetamide.

The polymers prepared in accordance with the process of our invention are outstanding in their solubility properties, especially in N,N-dimethylacetamide, a solvent in which the polyacrylonitrile previously prepared is not soluble to a sufficient degree to permit spinning of fibers therefrom. As shown above, N,N-dimethylacetamide is particularly useful in dissolving the polymers obtained in our process, since it is materially less toxic than dimethylformamide and gives solutions having greater stability when exposed to deteriorating conditions, as, for example, on standing. It can be seen that the objects set forth above have been accomplished, and that white fibers and colorless films of polyacrylonitrile are made available for the first time.

What we claim as our invention and desire to be secured by Letters Patent of the United States is:

1. A process for preparing polymers of arcylonitrile comprising polymerizing in the absence of heavy metal compounds an aqueous solution of acrylonitrile containing from 70 to 100 per cent by weight of acrylonitrile, based on the total weight of monoethylenically-unsaturated, polymerizable monomers in the solution, in the presence of a persulfate polymerization catalyst, a sufficient quantity of an oxygen acid of phosphorus consisting of only phosphorus, hydrogen, and oxygen atoms to maintain a pH of from 1 to 3 during the polymerization and a water-soluble inorganic compound of sulfur selected from the group consisting of alkali metal bisulfites, ammonium bisulfite, alkali metal sulfites, ammonium sulfite, alkali metal thiosulfates, ammonium thiosulfate, alkali metal sulfides, ammonium sulfides, hydrogen sulfide and sulfur dioxide.

2. A process for preparing polymers of acrylonitrile comprising polymerizing in the absence of heavy metal compounds an aqueous solution of acrylonitrile containing from 70 to 100 per cent by weight of acrylonitrile, based on the total weight of monoethylenically-unsaturated, polymerizable monomers in the solution, in the presence of a persulfate polymerization catalyst, a sufficient quantity of an oxygen acid of phosphorus consisting of only phosphorus, hydrogen, and oxygen atoms to maintain a pH of from 1 to 3 during the polymerization and an alkali metal bisulfite.

3. A process for preparing polymers of acrylonitrile comprising polymerizing in the absence of heavy metal compounds an aqueous solution of acrylonitrile containing from 70 to 100 per cent by weight of acrylonitrile, based on the total weight of monoethylenically-unsaturated, polymerizable monomers in the solution, in the presence of a persulfate polymerization catalyst, a sufficient quantity of orthophosphoric acid to maintain a pH of from 1 to 3 during the polymerization and an alkali metal bisulfite.

4. A process for preparing polymers of acrylonitrile comprising polymerizing in the absence of heavy metal compounds an aqueous solution of acrylonitrile containing from 70 to 100 per cent by weight of acrylonitrile, based on the total weight of monoethylenically-unsaturated, polymerizable monomers in the solution, in the presence of a persulfate polymerization catalyst, a sufficient quantity of phosphorous acid to maintain a pH of from 1 to 3 during the polymerization and an alkali metal bisulfite.

5. A process for preparing polymers of acrylonitrile comprising polymerizing in the absence of heavy metal compounds an aqueous solution of acrylonitrile containing from 70 to 100 per cent by weight of acrylonitrile, based on the total weight of monoethylenically-unsaturated, polymerizable monomers in the solution, in the presence of a persulfate polymerization catalyst, a sufficient quantity of hypophosphorous acid to maintain a pH of from 1 to 3 during the polymerization and an alkali metal bisulfite.

6. A process for preparing a homopolymer of acrylonitrile comprising homopolymerizing acrylonitrile in an aqueous solution containing acrylonitrile as the sole polymerizable compound in the presence of a persulfate polymerization catalyst, a sufficient quantity of an oxygen acid of phosphorus consisting of only phosphorus, hydrogen, and oxygen atoms to maintain a pH of from 1 to 3 during the polymerization and a water-soluble inorganic compound of sulfur selected from the group consisting of alkali metal bisulfites, ammonium bisulfite, alkali metal sulfites, ammonium sulfite, alkali metal thiosulfates, ammonium thiosulfate, alkali metal sulfides, ammonium sulfides, hydrogen sulfide and sulfur dioxide.

7. A process for preparing a homopolymer of acrylonitrile comprising homopolymerizing acrylonitrile in an aqueous solution containing acrylonitrile as the sole polymerizable compound in the presence of a persulfate polymerization catalyst, a sufficient quantity of an oxygen acid of phosphorus consisting of only phosphorus, hydrogen, and oxygen atoms to maintain a pH of from 1 to 3 during the polymerization and an alkali metal bisulfite.

8. A process for preparing a homopolymer of acrylonitrile comprising homopolymerizing acrylonitrile in an aqueous solution containing acrylonitrile as the sole polymerizable compound in the presence of a persulfate polymerization catalyst, a sufficient quantity of orthophosphoric acid to maintain a pH of from 1 to 3 during the polymerization and an alkali metal bisulfite.

9. A process for preparing a homopolymer of acrylonitrile comprising homopolymerizing acrylonitrile in an aqueous solution containing acrylonitrile as the sole polymerizable compound in the presence of a persulfate polymerization catalyst, a sufficient quantity of phosphorous acid to maintain a pH of from 1 to 3 during the polymerization and an alkali metal bisulfite.

10. A process for preparing a homopolymer of acrylonitrile comprising homopolymerizing acrylonitrile in an aqueous solution containing acrylonitrile as the sole polymerizable compound in the presence of a persulfate polymerization catalyst, a sufficient quantity of hypophosphorous acid to maintain a pH of from 1 to 3 during the polymerization and an alkali metal bisulfite.

THEODORE E. STANIN.
HARRY W. COOVER.
JOSEPH B. DICKEY.

REFERENCES CITED

The following references are of record in the file of this patent:

UNITED STATES PATENTS

| Number | Name | Date |
|---|---|---|
| 2,380,473 | Stewart | July 31, 1945 |
| 2,434,054 | Roedel | Jan. 6, 1948 |
| 2,436,926 | Jacobson | Mar. 2, 1948 |
| 2,462,354 | Brubaker et al. | Feb. 22, 1949 |
| 2,462,422 | Plambeck | Feb. 22, 1949 |
| 2,475,016 | De Nie | July 5, 1949 |
| 2,486,241 | Arnold | Oct. 25, 1949 |
| 2,503,244 | Coover et al. | Apr. 11, 1950 |
| 2,503,245 | Coover et al. | Apr. 11, 1950 |
| 2,531,407 | D'Alelio | Nov. 28, 1950 |